United States Patent Office 3,310,286
Patented Mar. 21, 1967

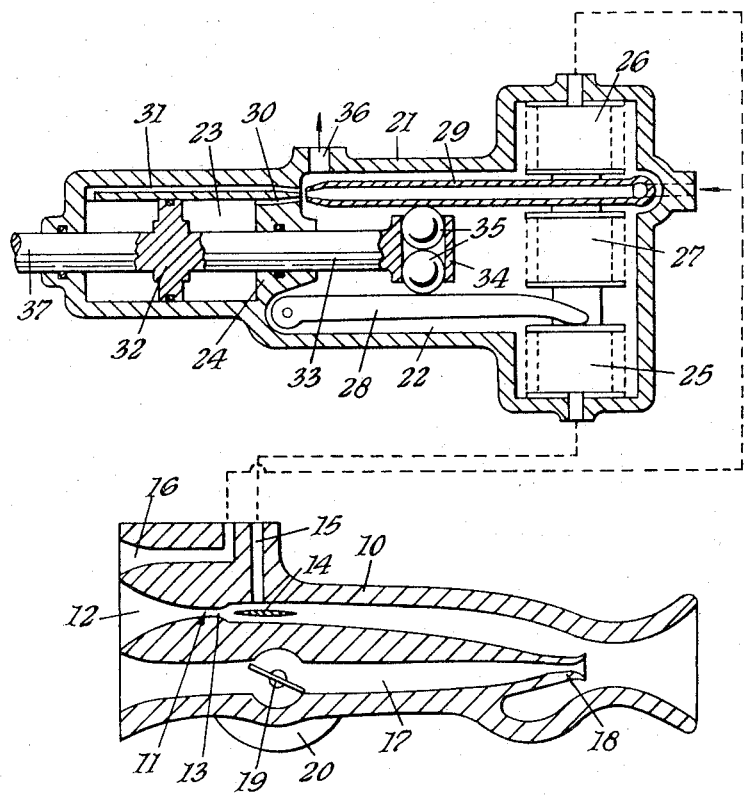

3,310,286
CONTROL APPARATUS FOR GAS TURBINE
ENGINE VARIABLE AIR INTAKES
Richard Joseph Ifield, Beecroft, New South Wales, Australia, assignor to Joseph Lucas (Industries) Limited,
Birmingham, England
Filed June 21, 1966, Ser. No. 559,223
4 Claims. (Cl. 253—52)

This invention relates to control apparatus for variable air intakes for gas turbine engines, the object of the invention being to provide apparatus of this kind in a convenient form.

In accordance with the present invention, control apparatus for a variable air intake of a gas turbine engine comprises a body intended to be disposed in the path of flow of air through said intake, said body having an air flow passage therein incorporating a restriction, a signal producing temperature sensitive element at the downstream side of said restriction in the passage, means in the body for controlling the pressure difference across the restrictor in accordance with the temperature of said element, and means for varying said intake in accordance with changes in said pressure difference across the restrictor.

The invention will now be described by way of example with reference to the accompanying drawings in which the single figure is a diagrammatic representation of a system incorporating this invention.

In the example show the apparatus includes a body 10 which is intended to be disposed downstream of a variable air intake for a gas turbine engine so that a passage 11 can receive a supply of air from the intake, this passage having a widened entry 12 and a restriction 13 between its ends. Immediately downstream of the restriction 13 is a temperature sensitive element 14 of the kind which is capable of displaying marked changes in electrical resistance within a small temperature range, such an element being itself well-known. Adjacent to the element 14, in the side wall of the passage 13, is a passage 15 in which pressure conditions, substantially the same as those obtaining at the element 14, exist. A further passage 16 in the body 10 is maintained at a pressure substantially the same as that of the upstream side of the restriction 13.

The body 10 also has a still further passage 17 extending substantially parallel with the passage 13 but joining the latter passage near the downstream end thereof and a substantial distance downstream of the restriction 13, the downstream end of the passage 17 itself being formed with an ejector nozzle 18. Between the ends of the passage 17 is a flap valve 19 controlled from a motor 20 in accordance with the electrical resistance, and therefore the temperature of the element 14, the electrical system incorporating amplifying means of known form (not shown).

This arrangement ensures that the temperature of the element 14 is maintained within close limits by controlling the pressure drop across the restriction 13 despite changes in pressure and temperature at the entry 12.

The passages 15 and 16 are connected to a means for varying the engine intake in accordance with the difference in pressure at the upstream and downstream sides of the restriction 13. This means comprises a hollow body 21 divided into two chambers 22 and 23 by a wall 24. The passages 15 and 16 communicate respectively with capsules 25 and 26 which are connected to opposite sides respectively of an evacuated capsule 27, all three capsules being disposed in the chamber 22. A movable wall of the capsule 25 supports one end of a lever 28 pivotally mounted at its opposite end within the chamber 22, and a movable wall of the capsule 26 bears on a hollow lever 29 pivoted within the chamber 22 near the capsule 26. At the pivot of the lever 29, fluid at relatively high pressure is supplied to the interior of the lever 29. The free end of the lever 29 is disposed adjacent to the wall 24 in which are formed two closely spaced passages 30 and 31 leading respectively to opposite ends of the chamber 23, which is in the form of a cylinder and in which is disposed a piston 32. Connected to the piston 32 is a rod 33 which extends through the wall 24 into the chamber 22, this rod 33 having a cage 34 in which are mounted two rollers 35 bearing upon the levers 28 and 29 respectively. The opposite side of the piston 32 is connected to a rod 37 whereby the intake is controlled. An opening 36 in the body 21 permits the escape of excess fluid from the hollow lever 29 to a suitable reservoir (not shown).

In use, the position of the hollow lever 29 is determined by the pressure difference across the restriction 13 through the lever 28 and rollers 35, the leverage between the lever 28 and the hollow lever 29 being dependent upon the position of the piston 32 in the chamber 23, this in turn being dependent upon the position of the lever 29 and therefore upon which of the two passages 30, 31 registers with the end of the hollow lever 29 to receive fluid therefrom.

The apparatus therefore provides control for the variable air intake in accordance with the pressure difference across the restriction 13 which in turn is dependent upon the temperature at the entry 12, by virtue of the fact that the pressure difference across the restrictor is used to control the temperature in the region of the element 14 at a substantially constant value.

Having thus described my invention what I claim as new and desire to secure by Letters Patent is:

1. Control apparatus for a variable air intake of a gas turbine engine comprising a body intended to be disposed in the path of flow of air through said intake, said body having an air flow passage therein incorporating a restriction, a signal producing temperature sensitive element at the downstream side of said restriction in the passage, means in the body for controlling the pressure difference across the restrictor in accordance with the temperature of said element, and means for varying said intake in accordance with changes in said pressure difference across the restrictor.

2. Control apparatus as claimed in claim 1 in which the means for controlling the pressure difference across the restrictor comprises a valve in a passage communicating at opposite ends respectively, upstream and downstream of the restrictor, said valve being controlled in accordance with temperature changes in said element.

3. Control apparatus as claimed in claim 2 in which the means for varying said intake in accordance with the pressure difference comprises a body containing a pair of pressure sensitive devices arranged to control the position of a hollow lever, to the interior of which fluid under pressure is admitted, the hollow lever having a discharge orifice arranged to discharge said fluid towards a pair of orifices in the body, the pressures in said orifices being dependent upon the position of the hollow lever, and the body also having a device responsive to the pressures in the orifices, for controlling said engine air intake.

4. Control apparatus as claimed in claim 1 in which the means for varying said intake in accordance with the pressure difference comprises a body containing a pair of pressure sensitive devices arranged to control the position of a hollow lever, to the interior of which fluid under pressure is admitted, the hollow lever having a discharge orifice arranged to discharge said fluid towards a pair of orifices in the body, the pressures of said orifices being dependent upon the position of the hollow lever, and the body also having a device responsive to the pressures in the orifices, for controlling said engine air intake.

No references cited.

MARTIN P. SCHWADRON, *Primary Examiner.*

E. A. POWELL, Jr., *Assistant Examiner.*